(12) United States Patent
Cook et al.

(10) Patent No.: US 6,788,770 B1
(45) Date of Patent: Sep. 7, 2004

(54) INTELLIGENT VOICE RESPONSE SYSTEM WITH NAVIGATOR DATABASE

(75) Inventors: Fred S. Cook, Olathe, KS (US); Durga Prasad Satapathy, Olathe, KS (US); Jinpeng Xiao, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 10/400,824

(22) Filed: Mar. 27, 2003

(51) Int. Cl.[7] .............................................. H04M 11/00
(52) U.S. Cl. .............................. 379/100.01; 379/90.01; 379/93.24
(58) Field of Search .......................... 379/93.17, 93.25, 379/90.01, 100.01, 100.11, 88.13, 88.17, 93.24, 100.08; 370/352

(56) References Cited

U.S. PATENT DOCUMENTS

| | | | |
|---|---|---|---|
| 5,068,888 A | | 11/1991 | Scherk et al. |
| 5,072,309 A | | 12/1991 | Brown |
| 5,357,562 A | * | 10/1994 | Metser et al. ............. 379/88.24 |
| 6,091,805 A | * | 7/2000 | Watson ..................... 379/93.17 |
| 2003/0005076 A1 | * | 1/2003 | Koch et al. ................. 709/217 |
| 2003/0112931 A1 | * | 6/2003 | Brown et al. ............. 379/93.23 |
| 2003/0133548 A1 | * | 7/2003 | Lee et al. ................. 379/93.17 |

* cited by examiner

Primary Examiner—Stella Woo (57) ABSTRACT

An intelligent voice response (IVR) unit coupled to a public switched telephone network provides predetermined services to a user according to an IVR menu having navigational paths to the predetermined services. The user provides selection signals to the IVR unit via a corresponding telephone call in the public switched telephone network to access the predetermined services. A navigator database stores menu definitions of respective navigational paths and is responsive to a request from the user to provide a digital representation of at least one of the navigational paths. The request identifies a desired navigational path, a desired format for the digital representation, and a destination for delivering the digital representation. An electronic delivery system transmits the digital representation in the desired format to the destination independently of the telephone call.

25 Claims, 5 Drawing Sheets

INTELLIGENT VOICE RESPONSE SYSTEM WITH NAVIGATOR DATABASE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to intelligent voice response systems accessed from touch tone telephones via a public switched telephone network, and, more specifically, to providing navigational aids to users for facilitating frequent access to predetermined services via an intelligent voice response system.

Intelligent voice response (IVR) systems provide automated telephone services for receiving incoming telephone calls, playing prerecorded messages and menu prompts, collecting touch tones or spoken commands from a caller, and executing corresponding actions. IVR technology has been employed in many services or applications including remote banking, ordering of goods and services (e.g., pay-per-view cable television programs), and accessing information from electronic databases (e.g., computer system help topics). The user typically navigates through a multi-level, hierarchical menu by pressing appropriate digits on a touch tone keypad in response to prompts spoken by the IVR system.

IVR systems provide many advantages over other automated access systems such as those found on the Internet. An IVR system provides a totally private and secure interconnection. Furthermore, the only equipment required for the caller is the telephone device itself. Therefore, a desired service can be accessed when no computer network is available.

An IVR unit will typically accept the input of a tone during its reproduction of the current voice prompt, so that a caller can make a selection as soon as it is identified (i.e., without waiting for the prompt to finish). Unless callers have accessed a particular IVR-based service many times, however, they usually cannot anticipate the current group of choices at any point within a multi-level menu. Therefore, they usually end up listening to all or most of the menu prompts before making their next selection. Depending upon the number of menu levels and the number of choices available at each level, it can take a substantial amount of time to obtain a desired action. Furthermore, if an incorrect choice is made while navigating the menu, it may take several additional steps to back up and return to the point where the mistake was made.

The resulting inefficiency of the typical IVR interface can lead to annoyance and frustration of the caller and increased load on (and increased cost of) the IVR equipment. In an attempt to minimize the time required to navigate a particular menu, voice prompts must be kept as short and concise as possible. However, the resulting prompts can become harder to comprehend. Fuller explanations of menu choices are typically not given because they would require additional complexity within the menu system.

SUMMARY OF THE INVENTION

The present invention has the advantages of reducing user interaction time with IVR systems, reducing load levels on (and thus cost of) IVR equipment, and reducing user annoyance and frustration. The invention provides electronic delivery of detailed navigational information for selected navigational paths to predetermined services available from an IVR system in response to either configured subscriber information or specific requests from users. The invention has the further advantage that information can be disseminated about hidden (i.e., unprompted) selections in an IVR menu to preferred users of the IVR system.

In one aspect of the invention, apparatus is provided comprising an intelligent voice response (IVR) unit for coupling to a public switched telephone network and providing predetermined services to a user according to an IVR menu having navigational paths to the predetermined services. The user provides selection signals to the IVR unit via a corresponding telephone call in the public switched telephone network to access the predetermined services. A navigator database stores menu definitions of respective navigational paths and is responsive to a request from the user to provide a digital representation of at least one of the navigational paths. The request identifies a desired navigational path, a desired format for the digital representation, and a destination for delivering the digital representation. An electronic delivery system transmits the digital representation in the desired format to the destination independently of the telephone call.

DETAILED DESCRIPTION OF PREFERRED EMBODIMENTS

Figure 1:
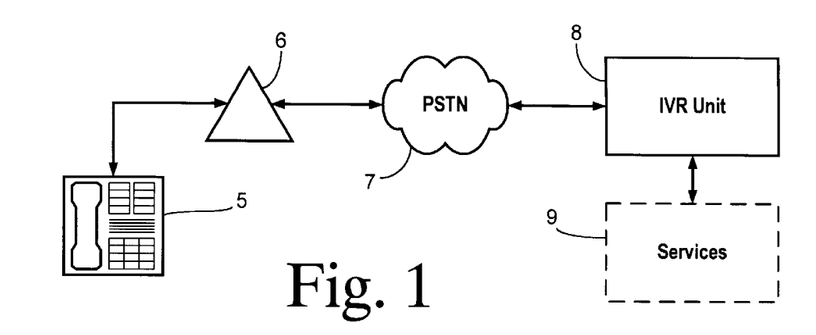
FIG. 1 is a block diagram showing a user interconnection to an IVR system.

FIG. 1 shows a conventional IVR system wherein a user telephone 5 establishes a telephone call with an IVR unit 8 via a local exchange carrier 6 and a public switched telephone network 7. IVR unit 8 is programmed to interface with one or more services 9.

Figure 2:
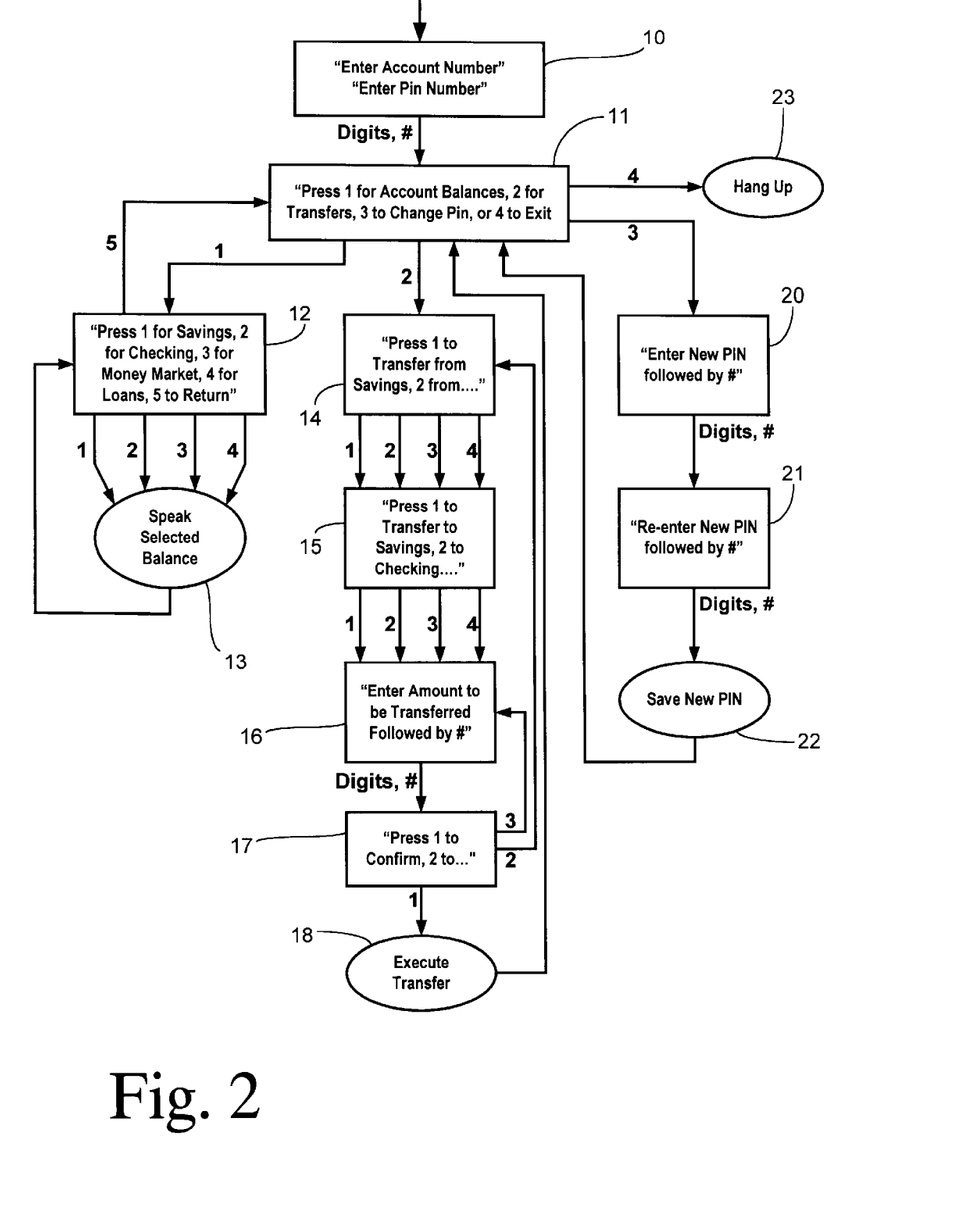
FIG. 2 is a diagram showing the sequence of an example IVR menu system.

FIG. 2 shows a simplified IVR selection menu with various navigational paths for a remote banking service. When a caller dials a predetermined telephone number for the service, they are connected with an IVR unit that is programmed to present prerecorded menu prompts as shown. In the menu sequence shown, the caller is first prompted to enter an account number and a personal identification number (PIN) at step 10. Each item of information is typically input by pressing the corresponding numbers on the touch tone keypad of a telephone followed by the pound sign (#). The IVR unit compares the received information with a database of authorized account holders to authenticate the caller. After a valid authentication, the caller gains access to the main menu selections.

At step 11, the voice prompt as shown presents choices for reviewing account balances, transferring funds between accounts, changing a PIN, and exiting. If digit 1 is selected from the keypad, then a next level of the menu is presented at step 12 for selecting the particular account (e.g., savings, checking, money market, or loan). If a digit 1 through 4 is selected, then the corresponding account balance is retrieved and output as synthesized speech by the IVR unit at step 13. If digit 5 is selected then a return is made to the previous level at step 11.

If digit 2 is selected at step 11, then a next level of the menu is presented at step 14 for choosing an account from which to transfer funds. At step 15, the receiving account is chosen. The caller is prompted to enter a monetary amount to be transferred (followed by #) in step 16. The IVR unit plays back the entered transaction and then prompts for confirmation is step 17. The caller may press 1 to confirm, 2 to start over with the transfer, or 3 to re-enter the amount. If digit 1 is pressed, then the IVR unit interacts with the bank's computer network to execute the transfer in step 18 and a return is made to step 11.

If digit 3 is selected from step 11, then a next level of the menu is presented for changing the caller's PIN. The caller is prompted to enter a new PIN in step 20 and to re-enter it in step 21. If the PIN's match, then the new PIN is saved in step 22, followed by a return to step 11.

If digit 4 is selected at step 11, then the menu is exited and the IVR unit hangs up the telephone call in step 23.

It can be appreciated from comparing the experience of navigating through the menu using a telephone to hear sequential voice prompts, on the one hand, with the ability to see the full menu of FIG. 1, on the other hand, how much more readily a menu structure can be comprehended when presented in a graphical representation of the various levels and choices at each level.

Figure 3:
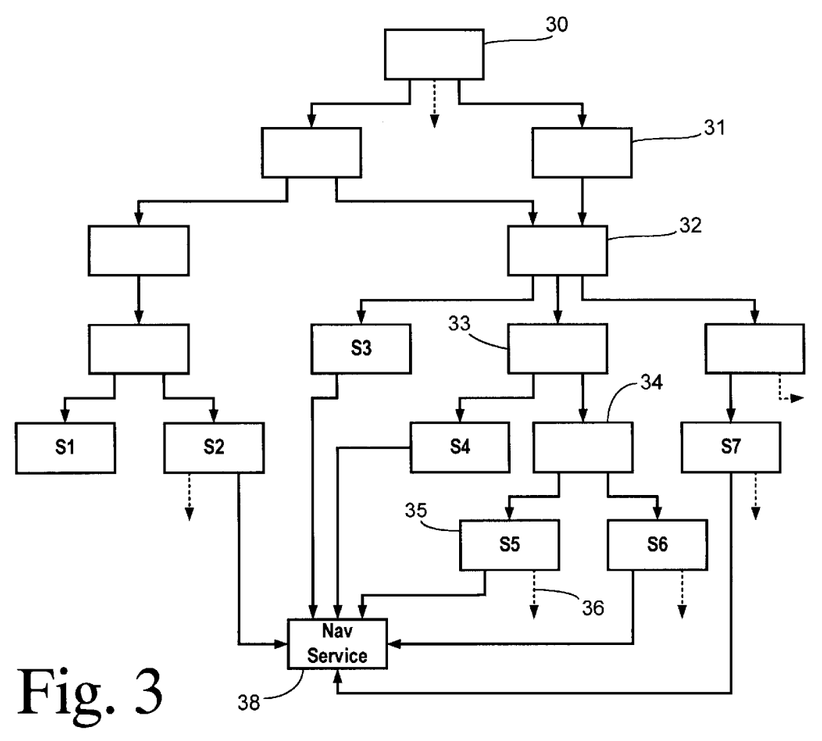
FIG. 3 is a diagram showing navigational paths to various services in another example of an IVR menu system.

A typical menu structure is much more complicated than that shown in FIG. 2. FIG. 3 shows a more extensive IVR menu for providing access to a plurality of different services SI through S7. The IVR menu forms a decision tree wherein user selections result in a progression along the branches of the tree along a particular navigational path to a desired service and then to particular actions within the desired service (as in FIG. 2). A navigational path to a service S5, for example, passes through menu branching points 30, 31, 32, 33, and 34 in response to appropriate user selections at each branching point. Further selections to use service S5 are made at branching point 35 and other branching points (not shown) reached by corresponding selections as indicated by dashed line 36. In one preferred embodiment, a navigator service 38 as described later is made available wherein a user can initiate a request for a visual navigational aid in the form of a digital representation of navigational paths associated with one or more services.

Figure 4:
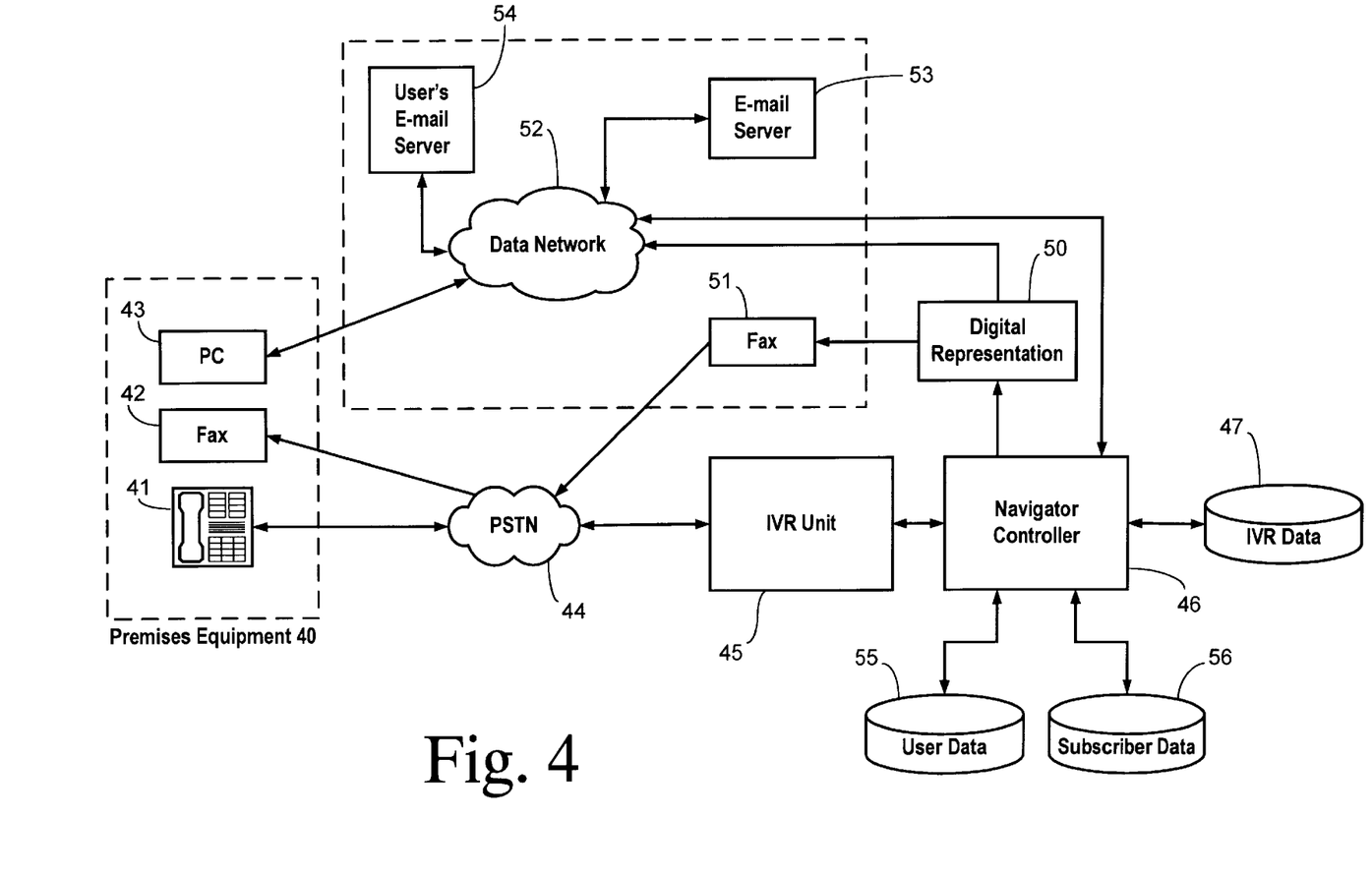
FIG. 4 is a block diagram showing the IVR navigator system and public communication networks for interacting with user premises equipment.

An improved system of the present invention shown in FIG. 4 employs user or customer premises equipment 40 including a telephone 41 and a graphical device such as a facsimile 42 or a personal computer 43 for receiving a navigational aid. Telephone 41 connects via a public switched telephone network (PSTN) 44 to an IVR unit 45. A navigator database system includes a navigator controller 46 and an IVR menu definition database 47. In a preferred embodiment, navigator controller 46 is connected to IVR unit 45 for receiving user requests as described below.

A digital representation 50 of a particular navigational path to and within a particular service or services (e.g., a graphic depiction such as shown in FIG. 2) is generated by navigator controller 46 according to a format identified in a user request for the digital representation. Available options for the requested format may include the language of text (e.g., English, Spanish, etc.), a type of representation (e.g., text only, graphics only, or mixed text and graphics), a mode of delivery (e.g., facsimile, e-mail, or direct file transfer), and options within the mode of delivery (e.g., type of computer file, such as an html webpage or a bitmap graphics file).

An electronic delivery system for providing a requested digital representation to a user independently of any telephone call by the user to IVR unit 45 may include a facsimile machine 51 for sending a digital representation (e.g., fax pages) to the user's facsimile machine 42 having a predetermined telephone number within PSTN 44. Alternatively, the user may request electronic delivery via a public data network 52 (e.g., the Internet), either by direct transfer to an IP address corresponding to PC 43 or by e-mail transfer to the user's e-mail address using e-mail servers 53 and 54 connected to public data network 52.

An owner/operator of IVR unit 45 and navigator controller 46 may desire to restrict access to navigation aids to a group of users. Thus, a user database 55 is coupled to navigation controller 46 containing authentication data (e.g., user ID's and passwords or PIN's) of the group of users and their respective permission levels for accessing information about various portions of the IVR menu structure. Restricted portions of a menu may include navigational paths for which audible prompts are not given during normal telephone access to IVR unit 45. Consequently, information can be disseminated about hidden selections in an IVR menu to preferred users of the IVR system. For example, administrative access for setting up predetermined services of the IVR unit can be made available to system operators using just conventional telephone access.

In order to allow scheduled actions (i.e., timed deliveries of particular digital representations), a subscriber database 56 for storing information about user requests is connected to navigation controller 46. The timing may be defined according to a certain time in the future (e.g., a user wants to receive a current version of the navigational path to a particular service on the first of each month) or may be triggered by a certain event (e.g., when a navigational path is changed then a new version of the digital representation is broadcast to each user that has signed up to receive updates).

A request for a navigational aid herein may be initiated either by the user or may be preconfigured by an operator/administrator of the IVR/navigator system. A request can be transmitted to navigator controller 46 via a special service provided by IVR unit 45 or via data network 52 using a browser interface, for example. The operator/administrator can also set up requests via direct access to the system hardware components. Whether a request is being made for an immediate response or is part of creation or modification of a subscription entry for a deferred delivery, it preferably includes an identification of a desired navigational path (e.g., the service point or functions that are to be reached), a desired format, and a destination address (e.g., fax telephone number, IP address, or e-mail address).

Figure 5:
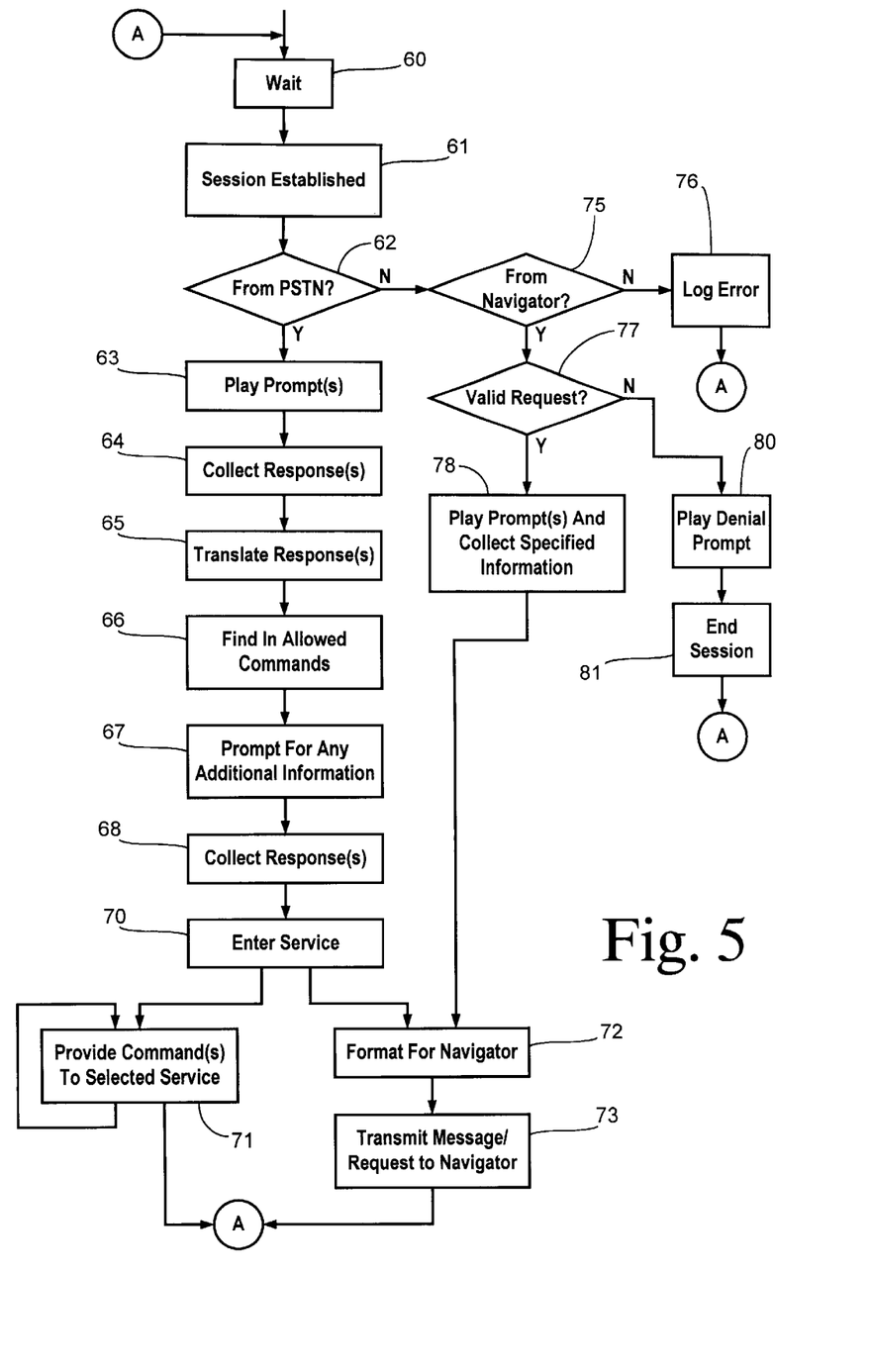
FIG. 5 is a flowchart showing a preferred method of operating an IVR unit according to the present invention.
Figure 6:
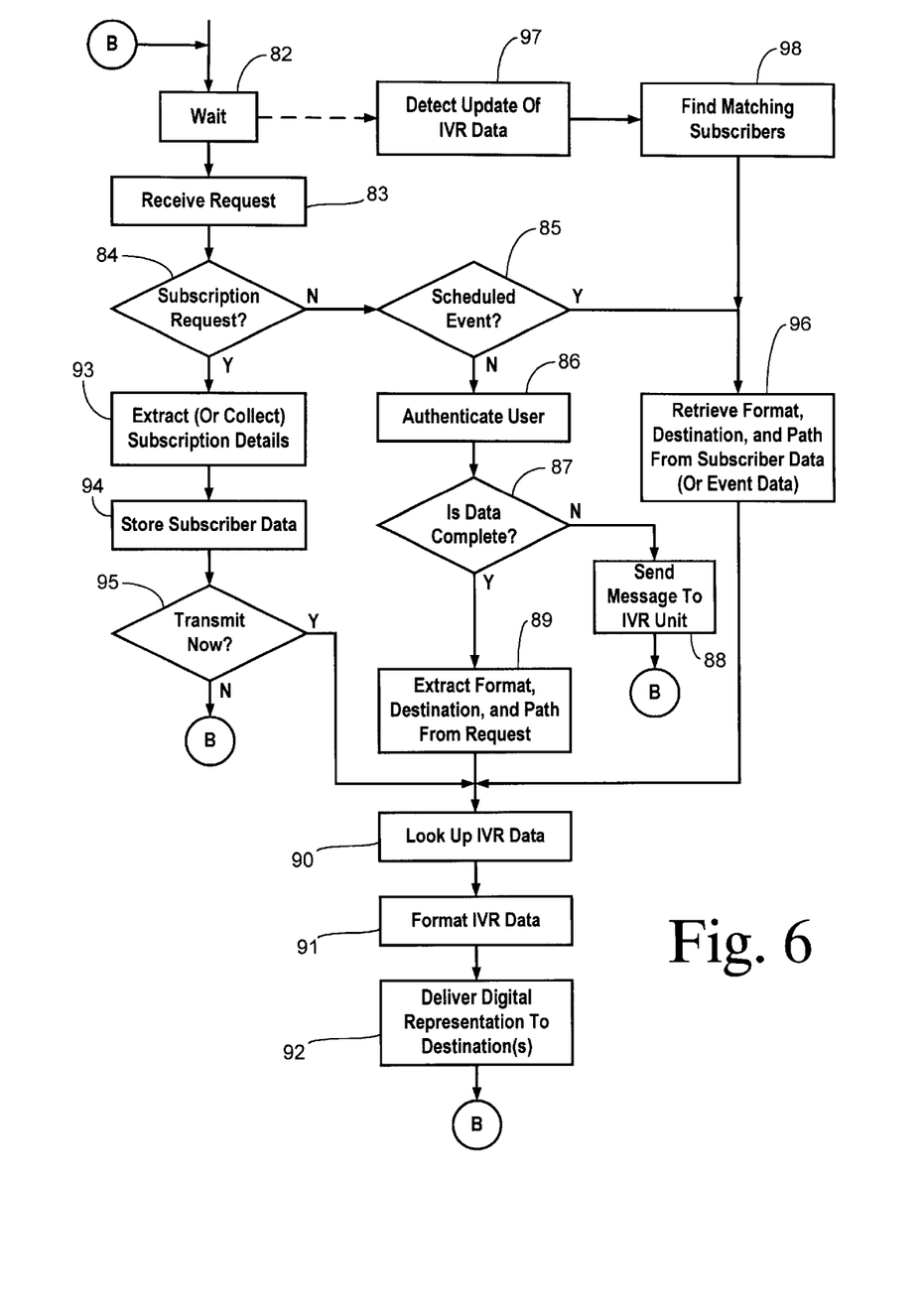
FIG. 6 is a flowchart showing a preferred method of operating a navigator unit according to the present invention.

FIGS. 5 and 6 show a preferred method of the invention wherein the IVR unit includes a service for initiating requests to the navigator database system. FIG. 5 shows operation of the IVR unit. After being initialized, the IVR unit waits for activity in step 60. When contacted by another device, a session is established in step 61. In step 62, a check is made to determine whether the contacting device is a telephone making an incoming telephone call from the PSTN. For example, a customer of a company offering products and/or services dials a telephone number of the company in order to obtain information or the products and services themselves. The customer telephone call may be re-directed to an IVR unit by the PSTN in a normal fashion.

If the session results from a telephone call, the IVR menu is activated. The IVR unit plays prompts in step 63 and collects responses in step 64 in a conventional manner. The user's responses are translated into corresponding digital commands in step 65. The translated commands may be checked in step 66 against a list of allowed commands (e.g., based on authentication and authorization of the user determined from their calling number using ANI or Caller ID or based upon prompting for and obtaining their user ID and password). The user is prompted for any additional information (e.g., the user ID and password) in step 67 and any responses are collected in step 68.

A selected service is entered in step 70 according to the commands received from the user. For a typical service, additional prompts and commands are exchanged in step 71 until the desired activity is completed, the session is terminated, and the IVR units returns to waiting step 60 via point A.

If the user inputs a command to access the navigator service, then that service is entered at step 70 and the command is formatted in step 72 for proper interfacing to the navigator database system (e.g., for an Ethernet link or a dialup networking link). The commanded message or request (e.g., navigational path, desired format, and destination) is transmitted to the navigator in step 73 and the IVR unit returns to waiting step 60 via point A. Steps 63–68 are appropriately programmed to collect the necessary details for a request, including any subscription data and authentication data as necessary.

In performing the navigator service, the navigator may initiate actions for sending messages back to the user via the IVR unit. If an incoming message is found not to be from the PSTN in step 62, then a check is made in step 75 to determine whether incoming signals are from the navigator via the link between the IVR unit and the navigator. If not from the navigator, then a communication error has occurred, which is logged in step 76 and a return is made to waiting step 60 via point A. If the signal is from the navigator, then a check is made in step 77 to determine whether it is a valid request. If valid, then appropriate prompts are played and the specific information needed from the user is collected in step 78. The, newly collected information is formatted in step 72 and transmitted to the navigator in step 73. If the request is determined to be invalid in step 77, then a denial prompt is played and the session is ended in step 81.

Operation of the navigator database system according to a preferred embodiment is shown in FIG. 6. In step 82, the navigator waits for incoming signals (e.g., from the IVR unit performing a navigation service, or from a data network connection when the user or operator sends a request from a remote computer). A service request is received in step 83. A check is made in step 84 to determine whether the request is for a subscription entry. If not a subscription request, then a check is made in step 85 to determine whether the request is a schedule event. If not a request for a scheduled event, then the request is being made in real time by the user. If not already authenticated by the IVR unit, then the user may be authenticated in step 86 based on obtaining authentication data (e.g., ID and password) from the incoming request that matches data in the user database. A check is made in step 87 to determine whether the request data is complete. If any information is missing, then a message is formatted and sent to the IVR unit in step 88 to request the missing information and a return is made via point B to waiting step 82.

If data is complete, then the navigator extracts the navigational path, digital format, and delivery destination from the request in step 89. In step 90, the IVR menu and definitions for the desired navigational path in the IVR database are obtained. For example, a service point or function identified in the request provides an IVR database key which is used to look up the corresponding IVR logic tree. The resulting tree may preferably be "pruned" to include only those commands relevant to the identified service point and authorizations for the particular user. In step 91, the pruned tree is formatted into the requested digital representation (unless the lookup in step 90 provides a tree already appropriately pruned and formatted), and the digital representation is delivered to the specified destination in step 92 using the corresponding type of delivery (e.g., fax, file transfer, or e-mail). The navigator then returns to waiting step 82 via point B.

If step 84 determines that the current request is one for an entry into the subscription database (i.e., the user is to automatically receive any updates when a navigational path to a specified service point is changed), then the subscription details are extracted from the request in step 93. If any necessary details are missing, then they can be collected via messages to and from the IVR unit. Once the details are complete, they are stored in the subscription database in step 94. A check is made in step 95 to determine whether the user also desired to have the digital representation transmitted at the current time. If so, then steps 90–92 are performed. Otherwise, a return to waiting step 82 is made via point B.

If step 85 determines that the current request is related to a scheduled action, then the stored action is retrieved from the stored event data in step 96 and the desired digital representation is sent in steps 904–92. The scheduling system used can be internal or external to the core of the navigator system. If external (e.g., event data is stored in the IVR unit or other related system), the navigator may see the incoming scheduled event as a normal, real-time request.

When an IVR menu tree is updated, the menu definitions contained in the navigator IVR database must likewise be updated. The updating is detected by the navigator database system in step 97 (e.g., an update detection may be performed by setting database modification triggers which generate a "notification event" when a data value changes). The navigator scans through its subscription database in step 98 to determine all users impacted by a navigational path change. A "schedule message" is generated for each impacted user that is subscribed to a schedule option with automatic tree update notification in step 98, then an appropriate digital representation for each user is generated and transmitted in steps 96 and 90–92.

What is claimed is:

1. Apparatus comprising:

an intelligent voice response (IVR) unit for coupling to a public switched telephone network and providing predetermined services to a user according to an IVR menu having navigational paths to said predetermined services, said user providing selection signals to said IVR unit exclusively via a corresponding telephone call in said public switched telephone network to access said predetermined services;

a navigator database storing menu definitions of respective navigational paths, said navigator database responsive to a request from said user to provide a digital representation of at least one of said navigational paths, said request identifying a desired navigational path, a desired format for said digital representation, and a destination for delivering said digital representation; and an electronic delivery system for transmitting said digital representation in said desired format to said destination independently of said user accessing said predetermined services.

2. The apparatus of claim 1 wherein said predetermined services include a navigator service for creating and transmitting said request to said navigator database.

3. The apparatus of claim 1 wherein said request is transmitted to said navigator database via a public data network.

4. The apparatus of claim 1 wherein said electronic delivery system comprises a facsimile machine for sending said digital representation as a facsimile transmission of a graphic file.

5. The apparatus of claim 1 wherein said electronic delivery system comprises a public data network.

6. The apparatus of claim 5 wherein said electronic delivery system comprises an e-mail system, wherein said destination comprises an e-mail address of said requesting user, and wherein said digital representation is transmitted within an e-mail message sent to said e-mail address.

7. The apparatus of claim 5 wherein said destination comprises an IP address of said requesting user within said public data network and wherein said digital representation is transmitted to said IP address within an electronic file readable by a browser application.

8. The apparatus of claim 1 wherein said request includes a scheduled event time for delivering said digital representation from said navigator database to said destination.

9. The apparatus of claim 1 further including a scheduler for scheduling said transmission of said digital representation by said electronic delivery system to said destination.

10. The apparatus of claim 1 wherein said navigator database detects when at least one of said menu definitions has been updated and automatically initiates a transmission of an updated digital representation to said user according to a preconfigured desired format and a preconfigured destination.

11. The apparatus of claim 10 further comprising a user database identifying subscribed users and corresponding navigation paths, each of said subscribed users receiving said updated digital representation whose identified navigation paths match said updated menu definitions.

12. The apparatus of claim 1 further comprising a user database identifying access authorization to said navigational paths for respective subscribed users, and wherein said request is compared with a respective access authorization for said user to determine whether to provide said identified digital representation.

13. A method for facilitating access to predetermined services via an intelligent voice response (IVR) unit coupled to a public switched telephone network, said method comprising the steps of:

configuring said IVR unit to provide an IVR menu having navigational paths to said predetermined services for accessing by a user, said user providing selection signals exclusively within a telephone call established via said public switched telephone network;

storing menu definitions of respective navigational paths in a navigator database;

said user initiating a request to said navigator database to provide a digital representation of at least one of said navigational paths, said request identifying at least one desired navigational path, a desired format for said digital representation, and a destination for delivering said digital representation;

generating said digital representation in response to said desired navigational path and said desired format; and electronically transmitting said digital representation to said destination independently of said user accessing said predetermined services.

14. The method of claim 13 wherein said predetermined services include a navigator service for creating and transmitting said request to said navigator database, said request being initiated during a telephone call to said IVR unit.

15. The method of claim 13 wherein said request is transmitted to said navigator database via a public data network.

16. The method of claim 13 wherein said transmitting step comprises sending said digital representation as a facsimile transmission within said public switched telephone network of a graphic file.

17. The method of claim 13 wherein said destination comprises an email address of said user within a public data network, and wherein said transmitting step comprises sending said digital representation within an e-mail message sent to said e-mail address.

18. The method of claim 13 wherein said destination comprises an IP address of said requesting user within a public data network, and wherein said transmitting step comprises sending said digital representation to said IP address within an electronic file readable by a browser application.

19. The method of claim 13 wherein said request includes a scheduled event time for delivering said digital representation from said navigator database to said destination.

20. The method of claim 13 further comprising the step of scheduling said transmission of said digital representation to said destination.

21. The method of claim 13 further comprising the steps of:

said navigator database detecting when at least one of said menu definitions has been updated; and automatically initiating a transmission of an updated digital representation to said user according to a reconfigured desired format and a preconfigured destination.

22. The method of claim 21 further comprising the step of configuring a user database identifying subscribed users and corresponding navigation paths, each of said subscribed users receiving said updated digital representation whose identified navigation paths match said updated menu definitions.

23. The method of claim 13 further comprising the steps of:

configuring a user database identifying access authorization to said navigational paths for respective subscribed users; and comparing said request with a respective access authorization for said user to determine whether to provide said digital representation.

24. Apparatus comprising:

an intelligent voice response (IVR) unit for coupling to a public switched telephone network and providing predetermined services to a user according to an IVR menu having navigational paths to said predetermined services, said user providing selection signals to said IVR unit via a corresponding telephone call in said public switched telephone network to access said predetermined services;

a navigator database storing menu definitions of respective navigational paths, said navigator database responsive to a request from said user to provide a digital representation of at least one of said navigational paths, said request identifying a desired navigational path, a desired format for said digital representation, and a destination for delivering said digital representation, wherein said navigator database detects when at least one of said menu definitions has been updated and automatically initiates a transmission of an updated digital representation to said user according to a preconfigured desired format and a preconfigured destination;

an electronic delivery system for transmitting said digital representation in said desired format to said destination independently of said telephone call; and a user database identifying subscribed users and corresponding navigation paths, each of said subscribed users receiving said updated digital representation whose identified navigation paths match said updated menu definitions.

25. A method for facilitating access to predetermined services via an intelligent voice response (IVR) unit coupled to a public switched telephone network, said method comprising the steps of:

configuring said IVR unit to provide an IVR menu having navigational paths to said predetermined services for accessing by a user, said user providing selection signals within a telephone call established via said public switched telephone network;

storing menu definitions of respective navigational paths in a navigator database;

said user initiating a request to said navigator database to provide a digital representation of at least one of said navigational paths, said request identifying at least one desired navigational path, a desired format for said digital representation, and a destination for delivering said digital representation;

generating said digital representation in response to said desired navigational path and said desired format;

electronically transmitting said digital representation to said destination independently of said telephone call;

said navigator database detecting when at least one of said menu definitions has been updated;

configuring a user database identifying subscribed users and corresponding navigation paths, so that each of said subscribed users can receive said updated digital representation whose identified navigation paths match said updated menu definitions;

automatically initiating a transmission of an updated digital representation to said user according to a preconfigured desired format and a preconfigured destination.

* * * * *